United States Patent [19]
Sorbie

[11] 3,743,074
[45] July 3, 1973

[54] ARTICLE STABILIZING DECELERATION GATE

[75] Inventor: Thomas B. Sorbie, Toledo, Ohio

[73] Assignee: Owens-Illinois, Inc., Toledo, Ohio

[22] Filed: Sept. 30, 1971

[21] Appl. No.: 185,053

[52] U.S. Cl. ............... 198/19, 193/33 AB, 198/76
[51] Int. Cl. ...................... B23q 5/22, B65g 37/00
[58] Field of Search ................... 198/29, 30, 33 AB, 198/19, 76; 209/72

[56] References Cited
UNITED STATES PATENTS

| | | | |
|---|---|---|---|
| 3,101,848 | 8/1963 | Uhlig | 209/72 |
| 2,226,872 | 12/1940 | Passow | 193/40 |

*Primary Examiner*—Richard E. Aegerter
*Attorney*—D. T. Innis and E. J. Holler

[57] ABSTRACT

Apparatus to slow articles in a stable manner as they exit from an inspection device in which the articles are precessed out of the inspection device by means of a continuously moving, side-engaging belt and a fixed rail. At the exit of the article inspection device, a pulley is driven by the belt which is used to move the articles through the device. The pulley is mounted on the outer ring of a rolling element bearing which has its rolling elements restrained within a vertically elongated cage. A deceleration disc having a radius larger than the pulley is driven by the elongated cage. Due to the difference in radii of the outer ring and the cage, the pulley will rotate faster than the deceleration disc. Thus, as articles are brought into contact with the deceleration disc as they exit the inspection device, they will be slowed.

5 Claims, 4 Drawing Figures

INVENTOR.
THOMAS B. SORBIE

INVENTOR.
THOMAS B. SORBIE

PATENTED JUL 3 1973

INVENTOR.
THOMAS B. JORBIE
BY
ATTORNEYS

ARTICLE STABILIZING DECELERATION GATE

BACKGROUND OF THE INVENTION

1. Field of the Invention

This invention is generally related to article inspection apparatus. More specifically, the invention relates to article inspection apparatus wherein the articles are removed from a flow of articles, inspected and ejected from the inspection apparatus at a speed higher than the entering speed. Yet more specifically, this invention relates to an apparatus for slowing articles as they leave such an inspection apparatus. Most specifically, this invention relates to an article-slowing apparatus driven by a high-speed article transfer belt used to move articles through an inspection apparatus.

2. Description of the Prior Art

U.S. Pat. No. 3,101,848 discloses a form of inspection apparatus widely used for the inspection of glass containers. This apparatus is commonly known as, and will hereinafter be referred to as the Owens-Illinois BH machine. The BH machine accepts glass containers one-at-a-time from a stream of glass containers, inspects the containers and ejects or returns the inspected containers onto the moving main conveyor from which they were originally removed for inspection. The containers are moved through the BH machine in a precessing motion under the influence of a high-speed driving belt and a fixed guide rail. The containers are moving much faster, as they exit from the BH machine, than is the conveyor on which they are deposited. The result is that the useful speed of the BH machine is limited, since the speed of exiting containers eventually becomes so high that the containers are turned or tipped over when they reach the slower speed main conveyor. The present invention presents an apparatus, driven off of the high-speed driving belt, which will slow exiting containers and thus stabilize their transfer onto the slow-speed main conveyor. Inspection rates as high as 190 bottles per minute have been achieved with the present invention in operation contrasted with a maximum rate of 120 bottles per minute without the use of an exit deceleration device.

SUMMARY OF THE INVENTION

Articles proceeding in single file along a relatively low-speed main conveyor are diverted to pass through an article testing station. The articles are carried through the testing station at a relatively high speed in a precessing fashion under the influence of a high-speed drive belt and a stationary guide rail. At the exit of the testing station, a deceleration means driven by the high-speed drive belt is used to slow the movement of the articles. This prevents the articles from tipping or falling over as they re-enter the relatively low-speed main conveyor.

DETAILED DESCRIPTION OF THE PREFERRED EMBODIMENT

Figure 1:
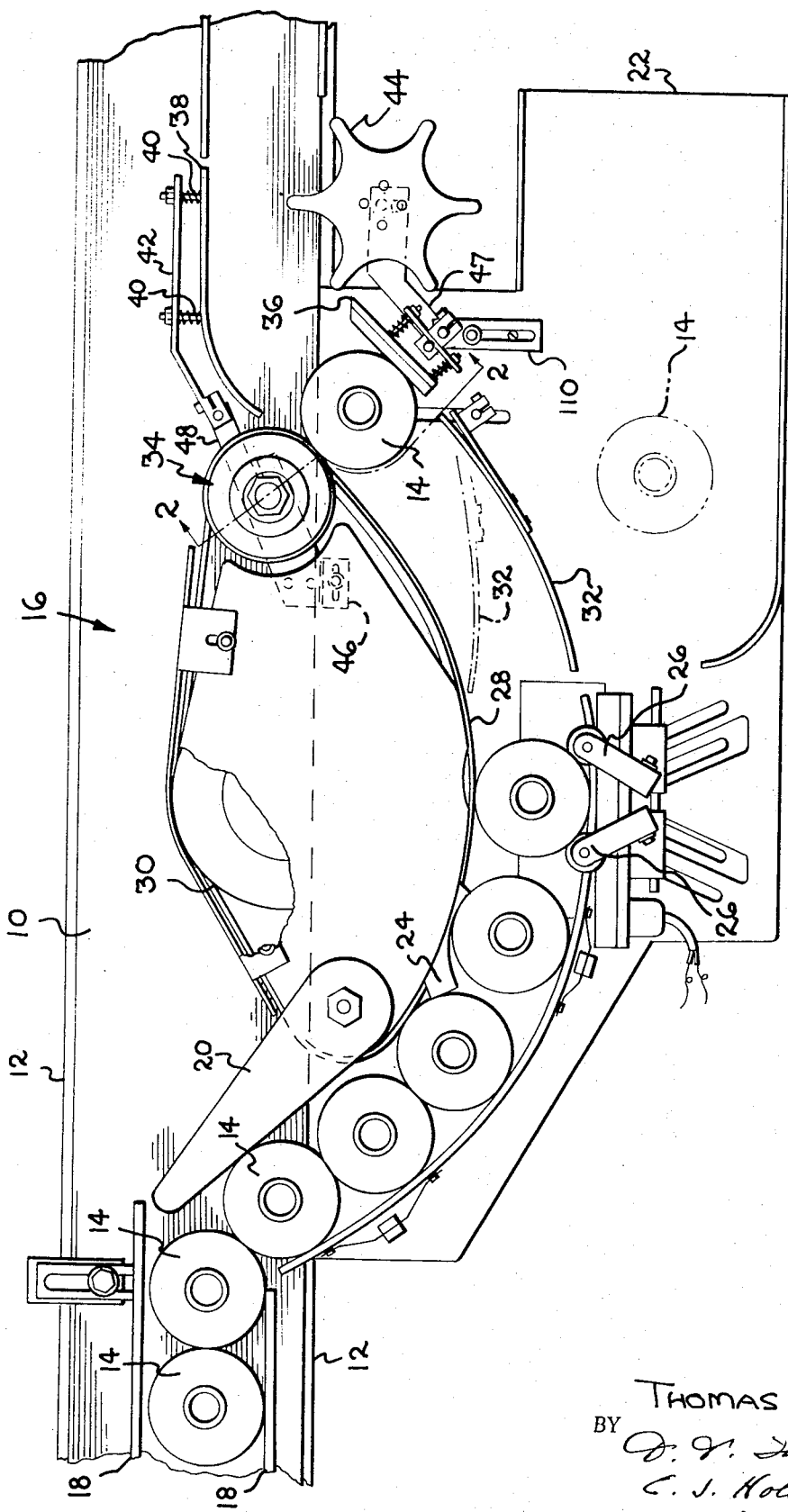
FIG. 1 is a plan view of the apparatus of the present invention showing the deceleration mechanism in its intended operating environment.

As shown in FIG. 1, a moving endless conveyor belt 10 supported by a frame 12 is used to present articles for inspection, in this particular case glass containers 14, to an inspection device or apparatus, generally designated 16. The containers 14 are guided into the inspection apparatus 16 by guide rails 18 and a diverting gate 20. The inspection apparatus 16 itself is of the type fully described in U.S. Pat. No. 3,101,848. Since the operation of such an inspection device is well known to those skilled in the art, the inspection functions of the device will not be discussed in detail. However, in order to fully understand the operation of the present invention, some specific aspects of the operation of the inspection device 16 will now be discussed. The components making up the inspection device 16 are supported by a horizontal, somewhat irregularly shaped, flat plate 22, itself supported by the conveyor frame 12, the flat plate 22 thus serving as a generally horizontal floor for the containers 14. As the containers 14 enter the inspection device 16 under the control of the guide rails 18 and the diverting gate 20, they are initially forced across the flat plate 22 by the pressure of other containers 14 behind them. A container escapement mechanism 24 holds back the flow of container 14 and allows only one container at a time to be fed into steadying arms 26. The arms 26 hold the container 14 while it is inspected by inspection means (not shown). The container 14 is rotated while it is held by the arms 26 by reason of its engagement with a continuously driven drive belt 28. The drive belt 28 is preferably of a toothed type, commonly known as a timing belt, and is driven by a drive sprocket 30. After being inspected, containers 14 are released by the arms 26 and moved toward the exit end of the inspection device 16 by engagement of the bottle between a side-guide rail 32 and the drive belt 28. As shown in FIG. 1, a portion of the side-guide rail 32 is moveable into the dotted-line position upon receipt of a rejection signal from the inspection devices and will cause a container 14 to be forced into the position shown by the dotted container 14 in FIG. 1. Those containers 14 which are considered acceptable are passed on toward the exit of the inspection station 16 and returned to the conveyor belt 10. The speed of the containers 14 as they leave the inspection device 16 to re-enter the conveyor belt 10 is much faster than the speed of the conveyor belt 10. Thus, there is a tendency for the containers 14 to topple over upon reaching the conveyor belt 10. To prevent this occurence, an article-stabilizing deceleration gate 34 has been provided adjacent the exit of the inspection device 16. Containers 14 are forced to pass between the article-stabilizing deceleration gate 34 and a spring-loaded backup plate 36 with a resultant slowing of the lateral as well as rotational velocity of the container 14 before it is allowed to reach the conveyor belt 10. As an additional means of stabilization, an exit guide rail 38 is spring-loaded with two backup springs 40 carried by a cantilevered arm 42. The spring-loading of the exit guide rail 38 helps absorb the velocity of any container 14 exiting from the inspection station 16. In addition, a nonpowered star wheel 44 is positioned to intercept containers 14 as they reach the exit guide rail 38 and, because of engagement with one of the pockets of the starwheel 44 and a consequent rotation of the starwheel 44, further stabilization of the container 14 is achieved. The starwheel 44 will, of course, be rotated by movement of the container 14, due to the influence of the conveyor belt 10 attempting to move the container 14.

Figure 2:
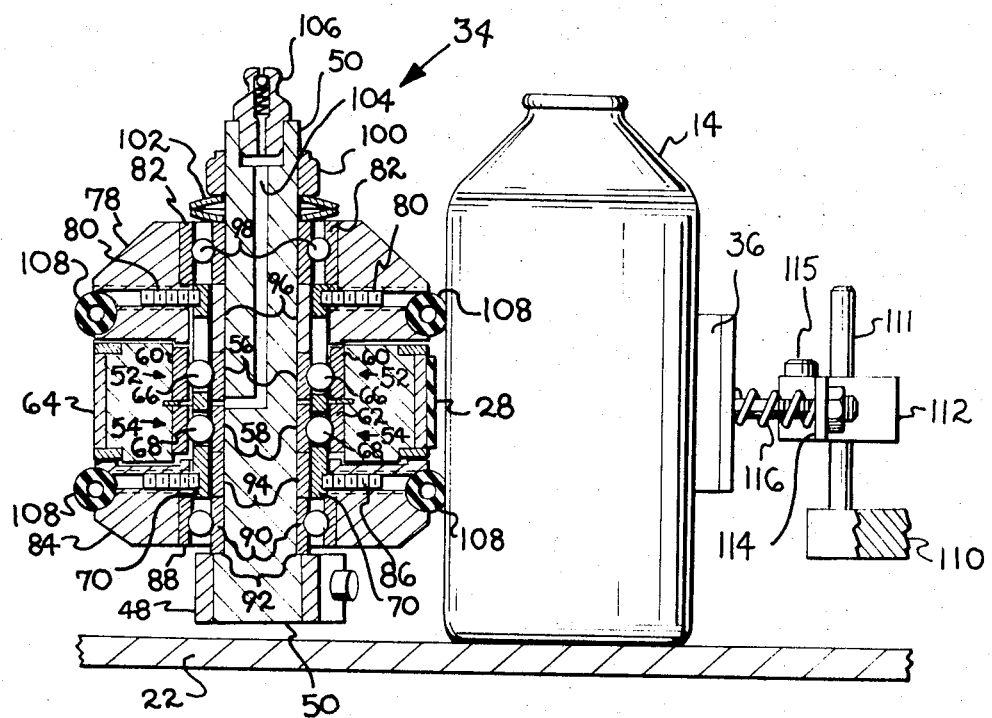
FIG. 2 is an elevational sectional view on an enlarged scale taken along the line 2—2 in FIG. 1.
Figure 3:
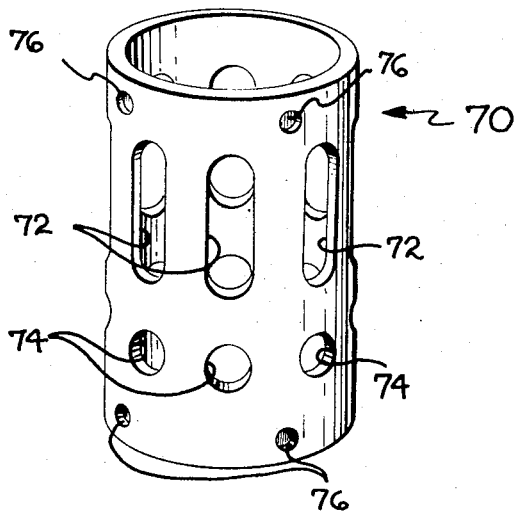
FIG. 3 is a perspective view of the rolling element retaining cage of FIG. 2, on an enlarged scale.

Turning now to FIG. 2, the article-stabilizing deceleration gate 34 is shown in cross section to allow explanation of the details of the operation of this mechanism. Attached to a cantilevered arm 48 is a stationary vertical shaft 50. An upper rolling element sprocket bearing 52 and a lower roller element sprocket bearing 54, which, in this preferred embodiment are commercial ball bearings, are pressed onto the stationary shaft 50 at approximately the vertical elevation of the drive belt 28. The inner ring 56 of the upper sprocket bearing 52 and the inner ring 58 of the lower sprocket bearing 54 are fixed in position on the shaft 50. The outer ring 60 of the upper sprocket bearing 52 and the outer ring 62 of the lower sprocket bearing 54 are pressed into a driven sprocket 64 which is engaged with, and driven by, the drive belt 28. The outer rings 60 and 62 may rotate with respect to the inner rings 56 and 58 through a plurality of upper balls 66 and a plurality of lower balls 68. The upper balls 66 and lower balls 68 are themselves retained within a unique ball-retaining cage 70. The ball-retaining cage 70 may best be understood by reference to FIG. 3, in which the ball-retaining cage 70 is shown in perspective. As clearly seen in FIG. 3, the ball-retaining cage is basically in an annular sleeve having a plurality of elongated slots 72 in its upper portion and a plurality of circular openings 74 in its lower portion. The lower balls 68 are retained within the circular openings 74 in the ball-retaining cage 70. The upper balls 66 rest in the lower portion of the elongated slots 72, the elongated slots being provided to allow the balls 66 to be easily loaded into the ball-retaining cage during the assembly process. It can easily be seen from FIG. 2 that the ball-retaining cage 70 extends some distance above the upper sprocket bearing 52 and some distance below the lower sprocket bearing 54. A series of holes 76 are provided near either extremity of the ball-retaining cage 70. An upper deceleration disc 78 is fastened to the ball-retaining cage 70 by the engagement of set screws 80 with their reduced inner ends extending into holes 76 in the ball-retaining cage 70. The upper deceleration disc 78 is rotatably mounted on the fixed shaft 50 by means of an upper disc bearing 82. In a similar fashion, a lower deceleration disc 84 is attached to the lower portion of the ball-retaining cage 70 by the engagement of set screws 86 with the lower set of holes 76 in the ball-retaining cage 70. The lower deceleration disc 84 is also rotatably mounted on the fixed shaft 50 by means of a lower disc bearing 88. The lower disc bearing 88 is held in a fixed vertical elevation on the shaft 50 by engagement of its inner ring 90 with a stepped ledge 92 formed on the shaft 50. An annular spacer 94 occupies the space between the inner ring 90 of the lower disc bearing 88 and the inner ring 58 of the lower sprocket bearing 54. A second annular spacer 96 maintains the space between the inner ring 56 of the upper sprocket bearing 52 in the inner ring 98 and the upper disc bearing 82. The entire unit, as thus described, is clamped and held together as a unit by the tightening of a nut 100, which is threaded onto a threaded upper portion of the shaft 50. A clamping hold-down force is provided through the interposition of Bellville springs 102 between the nut 100 and bearing 82. It will be noted that the shaft 50 is provided with a centrally drilled lubrication passageway 104 communicating with the upper sprocket bearing 52 and the lower sprocket bearing 54. Lubricant is introduced into the lubrication passageway 104 through a lubrication fitting 106 pressed into an opening in the upper portion of the shaft 50. It should be noted that the radius of the deceleration discs 78 and 84 is slightly larger than the radius of the driven sprocket 64. In this preferred embodiment, the peripheral edges of the deceleration discs 78 and 84 are covered with an elastomeric material of a generally toroidal form designated 108. The elastomeric material has a relatively high friction factor with respect to a container 14, and thus helps grasp and insure proper slowing of the container 14 by the article-stabilizing deceleration gate 34. In addition, the elastomeric material avoids abrasion of the sidewalls of the container 14 during the deceleration process. Also shown in FIG. 2 is the spring-loaded backup plate 36 which helps hold the container 14 in position against the deceleration discs 78 and 84 during the deceleration process.

Figure 4:
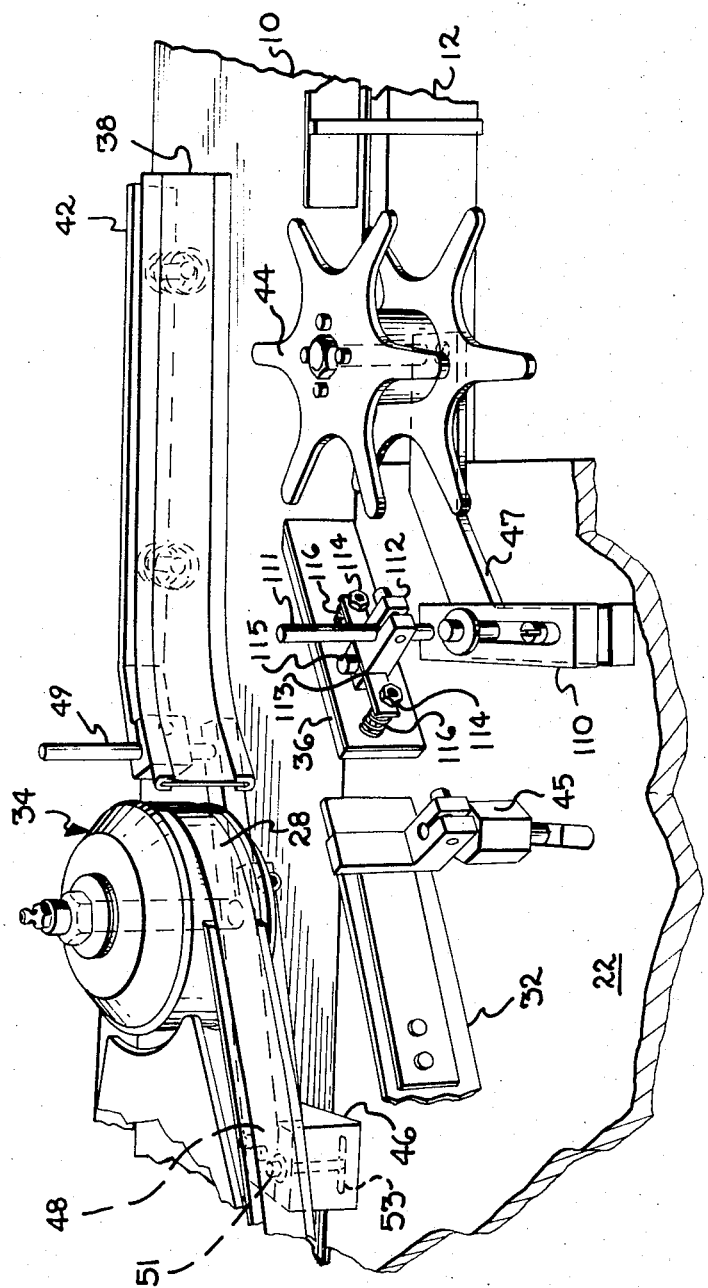
FIG. 4 is a perspective view of the exit of the apparatus of FIG. 1.

As best seen in FIG. 4, the article-stabilizing deceleration gate 34 is mounted on the cantilevered arm 48 which is attached to a mounting block 46. An extension of the cantilevered arm 48 carries a mounting post 49 which supports the arm 42. The mounting block 46 is attached to the flat plate 22 by a bolt 51 which is adjustable in a slot 53 in the plate 22. The side-guide rail 32 is carried by an operating shaft 45 which extends through the plate 22 to a rejection drive means (not shown). The starwheel 44 is carried by an angle plate 47 attached to the flat plate 22. A slotted support bar 110 fits over the angle plate 47 and serves to carry a support post 111. The support post 111 has attached to it an attachment block 112. The attachment block 112 carries a notched retaining plate 113 which fits over the attachment block 112, leaving projecting bosses 114. The notched retaining plate 113 is held in place by a bolt head 115, best seen in FIG. 2. Finally, two springs 116 are attached to the retaining plate 113 and carry the backup plate 36. The slot in the support bar 110 allows adjustment of the position of the backup plate 36 for various sizes of containers 14.

The operation of the apparatus is as follows:

As containers 14 leave the inspection arms 26, they are propelled toward the exit of the inspection station 16 in a precessing fashion under the influence of the drive belt 28 and the side-guide rail 32. During this time, the containers 14 begin to travel at a speed considerably faster than that of the conveyor belt 10. Just before the containers 14 re-enter the conveyor belt 10, they are contacted by the article-stabilizing deceleration gate 34. The upper and lower deceleration discs 78 and 84 are driven by the ball-retaining cage 70. The balls themselves are driven by the outer rings 60 and 62 of the upper and lower sprocket bearings 52 and 54. The sprocket bearings 52 and 54 are themselves driven by the drive belt 28 through the driven sprocket 64 and therefore are turning at the same velocity as the drive belt 28. However, since the balls 68 and 66 are a smaller radial distance from the center of rotation of the sprocket bearings 52 and 54 than are the outer rings 60 and 62 of these bearings, the balls 66 and 68 will rotate at a speed slightly more than half that of the outer rings 60 and 62. Since the balls 66 and 68 are trapped within the ball-retaining cage 70, the ball-retaining cage 70 is driven at the same rotational speed as the balls 66 and 68. The upper deceleration disc 78 and the lower deceleration disc 84 are in turn fastened to the ball-retaining cage 70, and must therefore rotate at a speed identical to that of the ball-retaining cage 70 and the balls 66 and 68. As a net result, the upper and lower deceleration discs 78 and 84 rotate at a speed approximately one-half that of the driven sprocket 64 and a speed approximately one-half that of the container 14 entering the article-stabilization deceleration gate 34. Contact of the container 14 with the elastomeric covering 108 of the peripheral edges of the deceleration discs 78 and 84 and the spring-loaded backup plate 36 will cause the container 14 to slow its speed to approximately one-half that of its previous velocity. This velocity is generally slow enough to allow the container 14 to re-enter the conveyor belt 10 without any problem of tipping over. As an additional means of stabilizing the container 14, the starwheel 44 and the exit guide rail 38 are also provided as previously noted.

I claim:

1. In an apparatus for inspecting articles having a horizontal main conveyor for supporting articles in upright position and carrying them in succession past an article testing station provided near one side at said main conveyor, with a generally horizontal floor having inlet and exit ends at one side at said main conveyor, with an inspection station located between said ends, with means for rotatively holding articles upright one-at-a-time at said inspection station, and with a continuously driven endless belt for both advancing articles in succession along said floor to and from said inspection station and rotating them while being held at said inspection station, the improvement comprising:

Rotating article decelerating means driven by said continuously driven endless belt at a speed less than the speed of said articles and mounted at the exit end of said horizontal floor in the path of travel of said articles for reducing the speed of said articles to return said articles from said floor to said main conveyor without overturning said articles as a result of engagement of said articles by said rotating article deceleration means.

2. The improvement of claim 1, wherein said article deceleration means comprises:
   a. A stationary vertical shaft adjacent the exit end of said horizontal floor;
   b. a rolling element bearing having inner and outer rings connected by a plurality of rolling elements, said inner ring being fixedly attached to said vertical shaft, said outer ring being free to rotate relative to said inner ring through said rolling elements;
   c. a driven member, carried by said outer ring, in engagement with said continuously driven endless belt;
   d. an elongated cage drivingly connected to said rolling elements; and
   e. a deceleration disc rotatably mounted on said vertical shaft and drivingly connected to said vertical cage, said deceleration disc having a radius greater than the radius of said driven member.

3. The apparatus of claim 2, wherein the periphery of said deceleration disc is covered with an elastomeric material.

4. The apparatus of claim 2, further including
   a. A second rolling element bearing having inner and outer rings connected by a plurality of rolling elements, said inner ring being fixedly attached to said vertical shaft below said first rolling element bearing, said second rolling element bearing outer ring being attached to said driven member and being free to rotate relative to said inner ring through said rolling elements, said cage extending vertically downward and drivingly connected to said rolling elements of said second rolling element bearing; and
   b. a second deceleration disc rotatably mounted on said vertical shaft below said second rolling element bearing and drivingly connected to said cage, said deceleration disc having a radius greater than the radius of said driven member.

5. The apparatus of claim 4, wherein the periphery of said second deceleration disc is covered with an elastomeric material.

* * * * *